United States Patent Office 3,223,665
Patented Dec. 14, 1965

3,223,665
STABLE AQUEOUS EMULSIONS OF ORGANOHYDROGENSILOXANES CONTAINING A WATER-SOLUBLE ALDEHYDE
Heinz Eder, Gauting, near Munich, Germany, assignor to Wacker-Chemie G.m.b.H., Munich, Bavaria, Germany
No Drawing. Filed Aug. 24, 1961, Ser. No. 133,562
Claims priority, application Germany, Aug. 26, 1960, W 28,456
3 Claims. (Cl. 260—29.2)

This invention consists of aqueous emulsions of organohydrogensiloxane rendered free of hydrogen gas evolution.

Aqueous emulsions of organohydrogensiloxane polymers are well-known commercial products. These emulsions are employed to render textiles, leather, paper and other fibrous materials water repellent. The emulsions are well known in the art from such publications as British Patent No. 645,768, dated February 21, 1951; U.S. Patents No. 2,588,365, dated March 11, 1952; No. 2,807,601, dated September 24, 1957; No. 2,927,870, dated March 8, 1960; No. 2,803,613, dated August 20, 1957; and No. 2,804,614, dated August 20, 1957. It is apparent the aqueous emulsions of organohydrogensiloxane polymers are well known in the art.

It has long been recognized that the hydrogen atoms bonded to silicon in organohydrogensiloxane polymers are subject to cleavage when the polymer is dispersed in water. The aqueous emulsions of organohydrogensiloxanes evolve hydrogen during storage. The emulsions must be stored and shipped in containers equipped with means for the hydrogen to escape to avoid build-up of pressure within the container. It is apparent the hydrogen build-up has at least two serious consequences, namely, the build-up of pressure within the container can be dangerous and the hydrogen may become sufficiently concentrated in the surrounding area to bring about an explosive mixture in unventilated storage areas.

It is known that light, particularly ultraviolet light, and alkaline agents encourage and accelerate the development of hydrogen. The emulsions are not stored in glass containers because of the alkaline nature of glass. Hence suitable metal containers and plastic containers such as polyethylene bottles are employed and the emulsions are stored in darkened areas when in transparent containers. A further technique employed to stabilize the emulsions has been the addition of a mild acid such as acetic acid to the emulsions thereby adjusting the pH of the emulsion to about 4.5 to 5.0. The enumerated techniques reduced hydrogen development in the emulsions but they have not prevented it.

It is the object of this invention to introduce a stable, non-gassing aqueous emulsion of organohydrogensiloxane polymer. A further object is a stable emulsion of organohydrogensiloxane particularly useful for treating leather, textiles and other fibrous materials to render them water repellent. Other objects and advantages of this invention are detailed in or will be apparent from this disclosure.

This invention consists of the addition of aldehydes to organohydrogensiloxane emulsions to produce stabilized emulsions.

The emulsions employed herein are described in the prior art noted supra. The siloxane polymers may be described by the unit formula $$R_nH_mSiO_{\frac{4-n-m}{2}}$$ 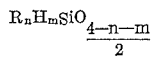

where each R is a monovalent organic radical selected from hydrocarbon radicals, halogenohydrocarbon radicals and cyanoalkyl radicals, $n$ has an average value from .9 to 3, $m$ has an average value from 0.5 to 1.5 and the sum of $m+n$ is less than 4.0. It is preferred that each R is an alkyl radical of less than 7 carbon atoms or an aryl radical but aryl radicals should not be present on more than 10 percent of the silicon atoms. In addition to the organohydrogensiloxane units the operable siloxanes can include alkoxylated siloxane units of the formula $$R'_aSi(OR')_bO_{\frac{4-a-b}{2}}$$ 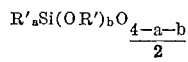

where each R' is an alkyl radical, $a$ has an average value from .9 to 3.0, $b$ has an average value from 0 to 3, preferably 0 to 1, and the sum of $a+b$ is less than 4. Copolymers of $Me_3SiO_{1/2}$ units and $SiO_{4/2}$ units, where Me is methyl having an Me/Si ratio in the range of 1/1 to 2.4/1, can also be present. The organohydrogensiloxane units can be copolymerized with the noted nonhydrogen-containing siloxane units or the organohydrogensiloxane polymer can be admixed with non-hydrogen-containing siloxane polymers or any other mixture of siloxane polymers containing significant quantities of HSi≡ units can be employed.

The aldehydes employed herein contain at least two carbon atoms per molecule and are soluble in water. Operable aldehydes include: (A) aliphatic aldehydes including saturated aldehydes such as acetaldehyde, propionaldehyde, butyraldehyde, isovaleraldehyde; unsaturated aldehydes such as acrolein, crotonaldehyde and propiolaldehyde; dialdehydes such as glyoxal, succinaldehyde and malealdehyde; and substituted aliphatic aldehydes such as chloral, aldol, glyoxylic acid, levulinaldehyde, phthalaldehyde, and phthalaldehidic acid. Also operative are (B) aromatic aldehydes including benzaldehyde, tolualdehydes, chlorobenzaldehydes and furfural. One may also use sym-trioxane, paraldehyde and similar polymeric aldehydes. In general, the operative aldehydes must be water soluble and are of the unit formula $$Z\overset{O}{\underset{\|}{C}}H$$ 

where Z is a hydrocarbon radical, preferably of less than 7 carbon atoms; a halogenohydrocarbon radical; or a $$-(CH_2)_x\overset{O}{\underset{\|}{C}}H$$ 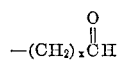

radical where $x$ is less than 5.

The aldehyde is employed in amounts ranging from .1 to 10 percent by weight based on the aqueous emulsions. The aldehyde can be added to the emulsion at any stage of preparation of the emulsion.

It has been found the low boiling aldehydes offer special benefits in that they can be removed during the curing stage after the siloxane emulsion has been applied to textile, leather or other material. A particularly useful embodiment of this invention comprises adding an acidic catalyst, e.g. acetic acid, to the emulsion containing the aldehyde and organohydrogensiloxane polymer. The emulsion can then be applied to textiles whereupon the fibers having reactive groups thereon, e.g. —OH groups, will be acetalized and this has an excellent effect of the impregnation.

The emulsions of this invention can contain any of the standard additives known for use therein. The presence of emulsifying agents is to be expected. Operable emulsifying agents include cationic agents such as quaternary ammonium halides, bis-trimethylbenzylammonium chloride and amines, especially the fatty acid amine condensates, as well as nonionic agents such as the alkyl ethers of polyalkylene glycols and the esters of polyhydric alcohols such as glycerin monostearate. The nature and quantity of emulsifying agent is not critical. In general, 1 to 50 percent by weight, based on the siloxane polymer present, of the emulsifying agent will be operative.

The emulsions generally contain 20 to 70 percent by weight of organosiloxane polymer wherein the portion of siloxane units present with Si bonded hydrogen is 20 to 95 percent by weight calculated on the siloxane content.

The following examples are included to aid those who are skilled in the art. The examples illustrate the invention but do not delineate its scope. All parts and percentages in the examples are based on weight and all viscosities are measured at 25° C. unless otherwise stated. In all of the examples, the hydrogen gas evolution was measured by trapping the gas over water at identical temperatures and pressures for the comparative samples.

*Example 1*

An aqueous emulsion was prepared by admixing 22 parts dimethylsiloxane polymer having a viscosity of 350 cs., 16.6 parts trimethylsiloxy endblocked methylhydrogensiloxane polymer having a viscosity of 30 cs., 1.5 parts liquid ethoxylated methylsiloxane polymer having a methyl to silicon ratio of 1.2/1 and containing 8 percent ethoxy groups and 2 parts polyethyleneglyoltrimethylnonylether. The mixture was emulsified by adding a total of 60 parts water in small increments employing a high speed mixer. Sufficient acetic acid was added to the mixture to give a pH of 4.5. One kilogram of this emulsion was stored in a glass flask and the hydrogen evolved during storage was trapped over water at air temperature and pressure. A second one-kilogram sample of the emulsion was placed in a glass flask and 3 percent acetaldehyde was added. The treated emulsion was stored under the same conditions and with the same apparatus as were employed in the emulsion sample free of aldehyde. The emulsion sample containing acetaldehyde had not evolved any measurable quantity of hydrogen during 20 days storage. The emulsion sample free of acetaldehyde evolved 45 cc. of hydrogen during the same 20 day period of storage.

*Example 2*

The method employed in Example 1 was repeated with 1 kg. control sample of emulsion as prepared in Example 1 and a 1 kg. sample of emulsion containing 1 percent crotonaldehyde. The control sample had developed 20 cc. of hydrogen during 9 days of storage whereas the sample containing crotonaldehyde evolved no measurable quantity of hydrogen during the 9 days storage.

*Example 3*

The method employed in Example 1 was repeated with a 1 kg. control sample of the emulsion of Example 1 and a 1 kg. sample of the same emulsion containing 5 percent acetaldehyde. After 46 days of storage, the control sample had evolved 270 cc. of hydrogen and the sample containing acetaldehyde had evolved only 53 cc. of hydrogen.

*Example 4*

Employing a commercial emulsion containing 16.6 percent of methylhydrogensiloxane polymer, two 100 g. samples were taken. A control sample was stored in glass without any additive and 1 percent of crotonaldehyde was added to the other sample. After 10 days storage the control sample had given off 2 cc. of hydrogen whereas the sample containing crotonaldehyde had not given off any measurable quantity of hydrogen.

*Example 5*

Equal samples of the emulsion of Example 4 were taken and 1 percent acetaldehyde was added to one of the samples. After 14 days of storage the control sample had given off 12.3 cc. of hydrogen as compared to only 6 cc. of hydrogen from the sample containing acetaldehyde.

*Example 6*

Four equal samples of the emulsion of Example 4 were taken and 3 percent acetaldehyde was added to one of the samples, 5 percent acetaldehyde to another and 10 percent acetaldehyde to a third sample, retaining the fourth sample as a control. After 40 days storage the samples had evolved hydrogen as follows: control—17.5 cc., 3 percent acetaldehyde—5.7 cc., 5 percent acetaldehyde—4.2 cc., and 10 percent acetaldehyde—3 cc.

*Example 7*

Equivalent results were achieved when Example 1 was repeated employing an equivalent proportion of propionaldehyde, glyoxal, benzaldehyde, glyoxyllic acid, levulinic aldehyde, butyraldehyde, or chloral in place of the acetaldehyde.

That which is claimed is:

1. In an aqueous emulsion containing 4 to 57.5 percent by weight of organohydrogensiloxane polymer, the improvement consisting of adding to the emulsion 0.1 to 10 percent by weight, based on the weight of the emulsion, of a water-soluble aldehyde containing at least two carbon atoms and selected from the group consisting of saturated aliphatic aldehydes, unsaturated aliphatic aldehydes, aliphatic dialdehydes, substituted aliphatic aldehydes, polymeric aldehydes, aromatic aldehydes and substituted aromatic aldehydes.

2. An aqueous emulsion consisting essentially of water, 20 to 70 percent by weight based on the total emulsion of organosiloxane polymer containing 20 to 95 percent by weight based on the polymer of organohydrogensiloxane units, 1 to 50 percent by weight based on the total emulsion of an emulsifying agent and 0.1 to 10 percent by weight based on the total emulsion of an aldehyde containing at least two carbon atoms per molecule.

3. The emulsion of claim 2 wherein the aldehyde is acetaldehyde.

References Cited by the Examiner

UNITED STATES PATENTS

| | | | |
|---|---|---|---|
| 2,789,956 | 4/1957 | Eder | 260—29.2 |
| 2,927,870 | 3/1960 | Beutler | 260—29.2 |

FOREIGN PATENTS

| | | |
|---|---|---|
| 790,038 | 1/1958 | Great Britain. |
| 805,529 | 12/1958 | Great Britain. |

MURRAY TILLMAN, *Primary Examiner.*

L. J. BERCOVITZ, *Examiner.*